J. H. BOUDREAU.
GATE OPERATING MECHANISM.
APPLICATION FILED FEB. 10, 1913.
1,096,015.
Patented May 12, 1914.
3 SHEETS—SHEET 2.
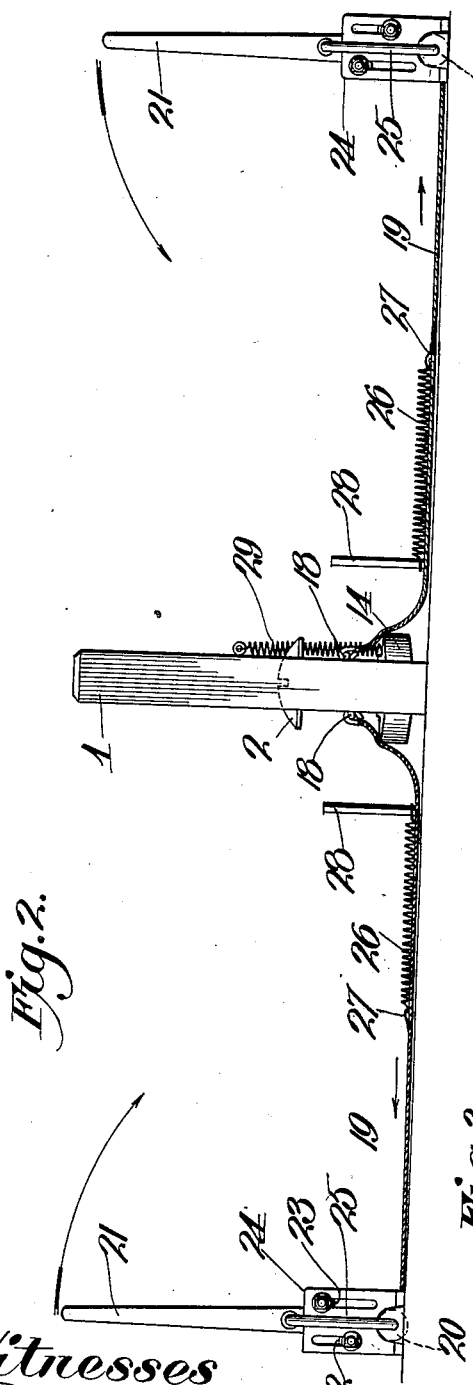
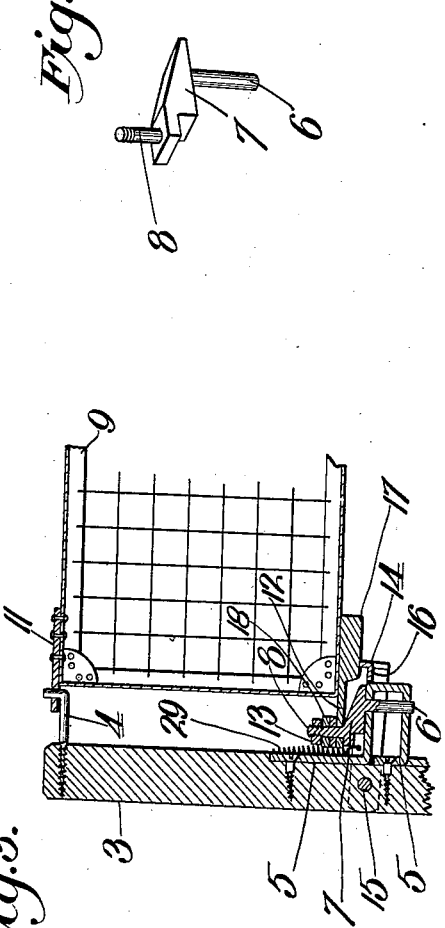
Witnesses
Frank R. Glon
H. C. Rodgers.
Inventor
J. H. Boudreau
By George F. Thorp, Atty J. H. BOUDREAU.
GATE OPERATING MECHANISM.
APPLICATION FILED FEB. 10, 1913.
1,096,015.
Patented May 12, 1914.
3 SHEETS—SHEET 3.
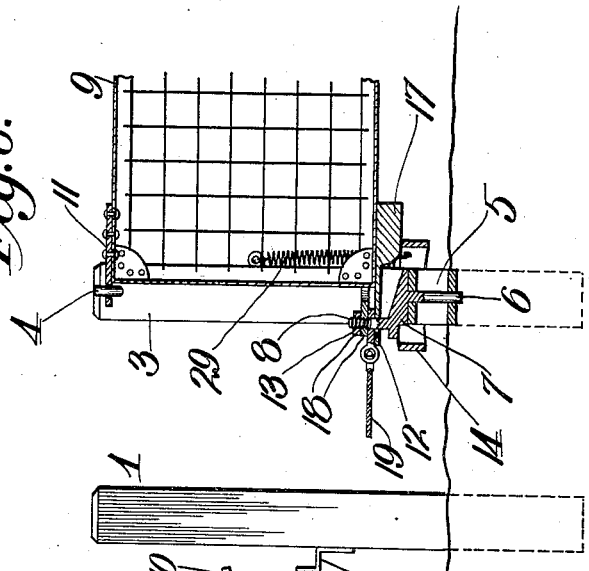
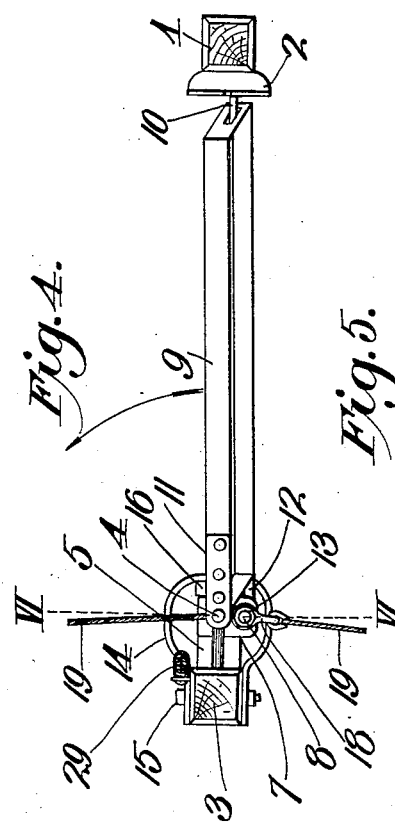
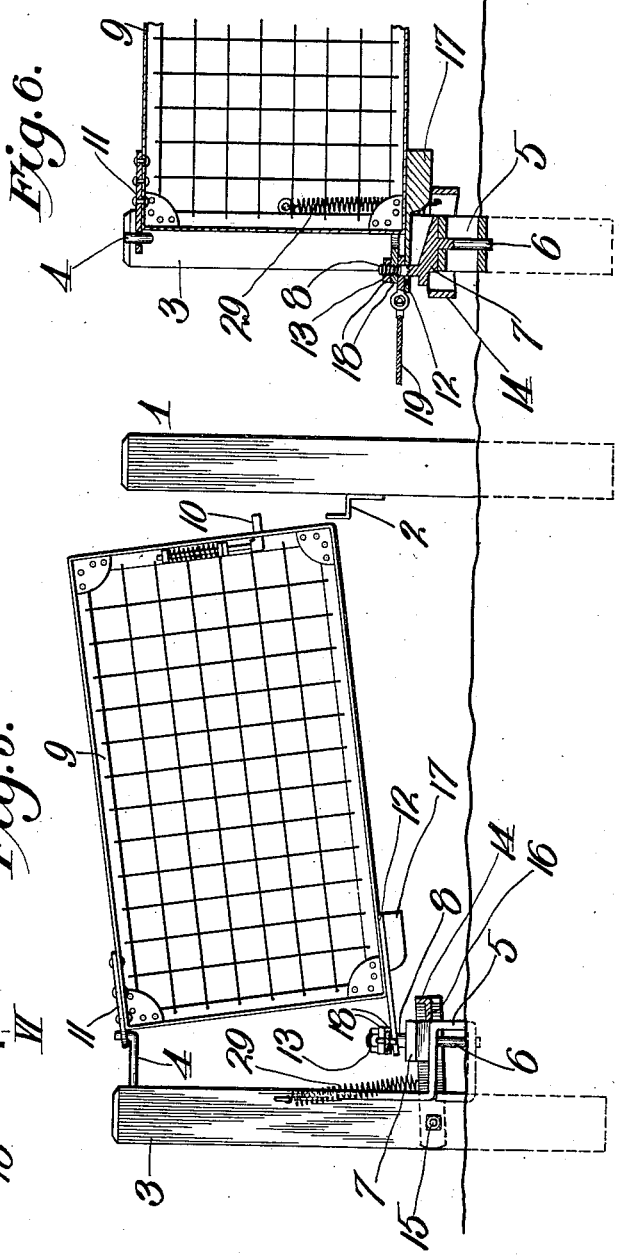
Witnesses
Frank R Glow
H.C. Rodgers
Inventor
J. H. Boudreau
By George J Thorpe Atty.

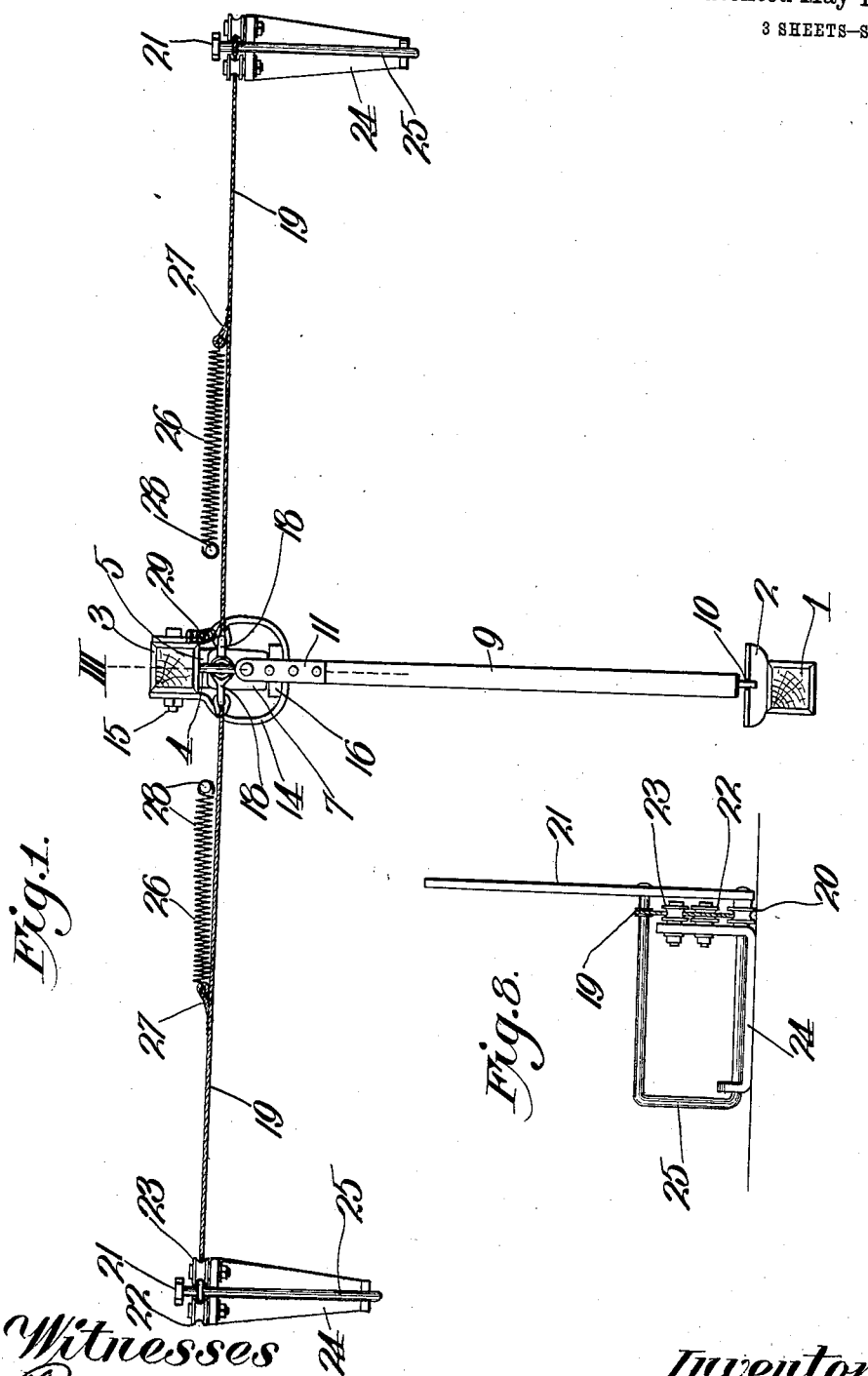

UNITED STATES PATENT OFFICE.

JOSEPH H. BOUDREAU, OF GRANT TOWNSHIP, KEARNEY COUNTY, NEBRASKA, ASSIGNOR OF ONE-HALF TO ROCK FOREST, OF LOGAN TOWNSHIP, NEBRASKA.

GATE-OPERATING MECHANISM.

1,096,015.  Specification of Letters Patent.  Patented May 12, 1914.

Application filed February 10, 1913. Serial No. 747,384.

*To all whom it may concern:*

Be it known that I, JOSEPH H. BOUDREAU, a citizen of the United States, residing in a citizen of the United States, residing in Grant township, in the county of Kearney and State of Nebraska, have invented certain new and useful Improvements in Gate-Operating Mechanisms, of which the following is a specification.

This invention relates to farm gates and more particularly to operating mechanism therefor which may be applied to gates already in use by hinging the same in an appropriate manner.

My object is to provide an improved hinge-crank structure and mounting, together with a peculiarly arranged flexible connection between said crank and the tripping levers.

A further object is the provision of means operated at each swinging of the gate to lock the hinge crank during the gate's movements.

With these objects in view the invention consists in certain novel and peculiar features of construction and organization as hereinafter described and claimed; and in order that it may be fully understood reference is to be had to the accompanying drawings, in which—

Figure 1, is a top plan view of a gate and operating mechanism embodying my invention, the gate being closed, and the operating mechanism in normal position. Fig. 2 is an elevation as viewed from the latch post side of the roadway. Fig. 3, is a section on the dotted line III of Fig. 1. Fig. 4, is a top view with the gate in unlatched position and about to swing open. Fig. 5, is an elevation showing the side of the gate when occupying the position shown by Fig. 4 and showing the locking lever in central vertical section. Fig. 6, is a section on the line VI—VI of Fig. 4 but with the gate swung in the direction indicated by the arrow Fig. 4, to open position. Fig. 7, is a detail perspective view of the crank forming the lower hinge of the gate. Fig. 8, is a detail view of one of the gate opening and closing levers.

In the said drawings, 1 is a latch post having a notched catch 2, of common and well-known type, and 3 is a hinge post having an upper hook-shaped hinge pin 4 of ordinary form. Near the ground the post 3 is provided with a bracket 5 and resting upon and pivoted to said bracket is a hinge crank.

The hinge-crank comprises a pivot pin 6 extending through the bracket 5 in vertical alinement with the hinge point of pin 4, a body 7 resting on bracket 5, and an upwardly projecting arm 8 which normally stands in the same vertical transverse plane as the hinge point of pin 4 and the pin 6 and is adapted as hereinafter explained to swing concentrically of the hinge point of pin 4 and said pin 6.

9 is a gate of any suitable construction provided with a sliding latch 10, for engagement with the notched latch 2, and at its upper hinged corner it is provided with a hinge plate 11, engaging the upturned end of pin 4 and at its lower hinge corner it is provided with a plate 12 pivotally engaging pin 8 and retained thereon by a nut 13.

The function of the hinge-crank is to raise the front end of the gate at the same time unlatching it and tilt it in the direction in which it is to swing to insure proper and complete opening and closing movements automatically.

To guard against accidental interruption of the opening and closing movements of the gate, it is necessary to eliminate all chance of accidental turning movement of the hinge-crank, and to accomplish this purpose, I provide a yoke-shaped lever 14, extending around the lower or shelf portion of the bracket 5 and pivoted at 15 to the hinge post, and provided inward of said post with a locking rib 16 normally held by the engagement with the inner portion of the yoke lever, of a rib 17 depending from the hinge plate 12 of the gate, depressed below the plane of the body of the hinge-crank to leave the latter free to turn.

The hinge crank is swung on pivot 6 from its initial position in Fig. 1, to one side or the other according to the direction in which it is desired to open the gate, and back to its said initial position to close the gate, these adjustments of the hinge-crank being effected by the following mechanism: Pivoted to the pin 8 is a pair of links 18, and 19 are flexible connections leading from opposite sides of the gate along the roadway at the hinge post side thereof, to and under sheaves 20 mounted coincidentally with the axes of a pair of levers 21. From the sheaves 20 the cables extend upward and engage the inner sides of sheaves 22 and outer sides of sheaves 23, mounted on L-shaped brackets 24 extending transversely of the roadway and forming pivotal supports for the levers. As a convenient construction, U-shaped frames 25 are arranged horizontally with their lower arms journaled in the brackets 24 and forming the pivots of levers 21, and their upper arms disposed above the brackets 24 and secured to the levers, and to said upper arms the outer extremities of the cables 19 are securely fastened in any suitable manner. To hold the outer portions of the flexible connections under tension so as to maintain the levers 21 in vertical position, retractile springs 26 are secured at their outer ends as at 27 to cables 19 and at their inner ends are anchored to stakes or equivalent anchors 28. This provides a certain degree of slack between the points 27 of the cables and the links 18.

The operation is as follows:—As one of the levers 21 is swung toward the gate either by hand or through the engagement of the wheel of a vehicle, with frame 25, the flexible connection is drawn around sheave 23 in the direction indicated by the arrow in Fig. 2, against the resistance of the connected spring 26. The first part of the lever's movement takes up the slack in the cable between points 27 and 18, after which, by the further operation of the lever the hinge crank is swung from the position shown in Fig. 1 to the position shown in Fig. 4. By this action the hinge crank is swung about the axis of its pivot pin 6, thereby tilting the gate upwardly at its free end as shown most clearly in Fig. 5. As the gate is thus raised or tilted, rib 17 moves out of the path of the yoke lever, and spring 29, connecting said lever with the hinge post, raises the former until its locking rib 16 is disposed in the path of the hinge crank. This rib prevents the hinge crank from turning more than ninety degrees, and also from swinging back toward its original position as the gate, through being tilted both vertically and laterally, as shown most clearly in Fig. 4, swings away from the operated lever 21 to an open position (see Fig. 6). As the gate reaches open position, it drops again into horizontal alinement, whereupon its rib 17 again engages and depresses the yoke lever until the locking rib thereof is below the horizontal plane of the hinge crank so that the hinge crank shall be free to be turned in the reverse direction to close the gate. The reclosure is effected after the gate is passed by operating the second lever 21, in the same direction as the first. In the operation of the first lever, the slack was removed from the cable 19 of the second lever, so that the swinging of the latter at once operates its cable around the sheave 22, pulling the cable in the direction indicated by the arrow at the right hand side of the gate in Fig. 2. This results in returning the hinge crank to initial position, and thereby closes the gate. As the gate is closed its latch slides over the catch of the latch post and is resecured in its closed position in an obvious manner. It is clear of course that the gate can be opened by operating either lever 21 toward it and closed by operating the other lever away from it.

Parts which can be housed are adapted to be so protected but as this forms no part of the invention, it is unnecessary to show or describe the housing.

From the above description it will be apparent that I have produced a gate structure possessing the features of advantage enumerated as desirable and I wish it to be understood that while I have illustrated and described the preferred embodiment of the invention, I wish it to be understood that I reserve the right to make all changes properly falling within the spirit and scope of the invention as defined in the appended claims.

I claim:—

1. In a gate structure, a gate, a fixed hinge at the upper corner of the gate, a hinge-crank journaled below the first-named hinge and provided with an upwardly-projecting pin forming the lower hinge of the gate, means to turn the hinge crank to effect the opening and closing of the gate, and means movable automatically into and out of the path of the hinge crank for locking the same during the opening and closing movements of the gate.

2. In a gate structure, a gate, a fixed hinge at the upper corner of the gate, a hinge-crank journaled below the first-named hinge and provided with an upwardly-projecting pin forming the lower hinge of the gate, means to turn the hinge-crank to effect the opening and closing of the gate, means movable into and out of the path of the hinge crank for locking the same during the opening and closing movements of the gate, and means movable with the gate for controlling the movements of said locking means.

3. In a gate structure, a gate, a fixed hinge at the upper corner of the gate, a hinge crank journaled below the first-named hinge and provided with an upwardly-projecting pin forming the lower hinge of the gate, means to turn the hinge-crank to effect the opening and closing of the gate, a stop movable into position alongside the hinge crank during the opening and closing movements of the gate for limiting the movement of said hinge crank, and means movable with the gate for controlling the movements of said stop.

4. In a gate structure, a gate, a fixed hinge at the upper corner of the gate, a hinge crank journaled below the first-named hinge and provided with an upwardly-projecting pin forming the lower hinge of the gate, means to turn the hinge-crank to effect the opening and closing of the gate, a yoke lever, yielding means for holding said lever against the hinge-crank to lock the same during the opening and closing movements of the gate, and means movable with the gate for depressing said yoke lever from engagement with the hinge-crank as the gate attains its open or closed position.

5. In a gate structure, a hinge post, a latch post, a gate having a latch to be interlocked with the latch post, a fixed hinge between the upper end of the gate and the hinge post, a hinge-crank bearing a journaled relation to the hinge post and provided with a pin forming the lower hinge of the gate, a yoke lever extending around the hinge-crank and pivoted to the hinge post and provided with a locking rib to engage either side of the hinge-crank to prevent turning movement thereof, means depending from the gate for holding the yoke lever with its locking rib out of the path of movement of the hinge crank when the gate is opened or closed, and means to operate said yoke lever to cause its locking rib to engage the hinge-crank to hold the same from turning during the swinging movements of the gate.

In testimony whereof I affix my signature in presence of two witnesses.

JOSEPH H. BOUDREAU.

Witnesses:
H. C. ARNOLD,
A. L. HENREUX.

Copies of this patent may be obtained for five cents each, by addressing the "Commissioner of Patents, Washington, D. C."